United States Patent [19]

Itoh et al.

[11] Patent Number: 4,872,115
[45] Date of Patent: Oct. 3, 1989

[54] APPARATUS FOR CONTROLLING CONTINUOUSLY VARIABLE TRANSMISSION

[75] Inventors: Hiroshi Itoh; Mitsuru Takada, both of Toyota, Japan

[73] Assignee: Toyota Jidosha Kabushiki Kaisha, Toyota, Japan

[21] Appl. No.: 918,058

[22] Filed: Oct. 14, 1986

Related U.S. Application Data

[63] Continuation-in-part of Ser. No. 661,813, Oct. 17, 1984, abandoned.

[30] Foreign Application Priority Data

Oct. 19, 1983 [JP] Japan .................. 58-194191

[51] Int. Cl.$^4$ ............... B60K 41/18; G06F 15/20
[52] U.S. Cl. ............... 364/424.1; 364/565; 364/569; 74/866
[58] Field of Search ............... 364/424.1, 565, 569; 74/866, 865, 861, 867; 474/11, 12, 18, 28

[56] References Cited

U.S. PATENT DOCUMENTS

| | | | |
|---|---|---|---|
| 4,261,229 | 4/1981 | Mizuno et al. | 74/866 |
| 4,458,318 | 7/1984 | Smit et al. | 364/424.1 |
| 4,459,878 | 7/1984 | Frank | 74/865 |
| 4,485,443 | 11/1984 | Knodler et al. | 74/866 |
| 4,490,790 | 12/1984 | Shinoda | 74/866 |
| 4,493,228 | 1/1985 | Vukovich et al. | 74/866 |
| 4,495,576 | 1/1985 | Ito | 364/424.1 |
| 4,506,563 | 3/1985 | Hiramatsu | 74/866 |
| 4,536,171 | 8/1985 | Tanaka et al. | 74/866 |
| 4,546,673 | 10/1985 | Shigemutsu et al. | 74/866 |
| 4,569,254 | 2/1986 | Itoh et al. | 74/866 |
| 4,590,561 | 5/1986 | Abo et al. | 364/424.1 |
| 4,747,325 | 5/1988 | Morimoto | 364/424.1 |

Primary Examiner—Parshotam S. Lall
Assistant Examiner—Ellis B. Ramirez
Attorney, Agent, or Firm—Oblon, Spivak, McClelland, Maier & Neustadt

[57] ABSTRACT

An apparatus for controlling A continuously variable transmission for use in an automotive vehicle, such that an actual engine speed coincides with a desired engine speed, wherein the desired engine speed in a transient state of the vehicle with an accelerator pedal being operated is determined based at least on a rate at which the accelerator pedal is operated.

11 Claims, 8 Drawing Sheets

APPARATUS FOR CONTROLLING CONTINUOUSLY VARIABLE TRANSMISSION

The present application is a continuation-in-part of U.S. patent application Ser. No. 661,813, filed on Oct. 17, 1984, and now abandoned.

BACKGROUND OF THE INVENTION

1. Field of the Invention

The present invention relates generally to an apparatus for controlling a continuously variable transmission (hereinafter referred to as "CVT") incorporated in a power transmitting system of an automotive vehicle. More particularly, the invention is concerned with such a control apparatus for controlling the CVT while the vehicle is in a transient running condition.

2. Discussion of the Related Art

A CVT is used for a motor vehicle as a power transmission for controlling the speed ratio e (Nout/Nin, where Nout=output speed of the CVT, Nin=input speed of the CVT) in a continuous fashion, so as to improve the specific fuel consumption of the vehicle. In the CVT, the currently required horsepower is determined as a function of a position $\theta$ of a throttle valve of the engine. The desired speed Ne of the engine is determined so as to attain the determined horsepower required at each throttle position $\theta$ with minimum fuel consumption. Conventionally, this desired engine speed is determined, irrespective of whether the vehicle is running in a steady state or in a transient state. Namely, the same desired speed is used for the same throttle position $\theta$ in both the steady and transient states of the vehicle. In the transient state, it takes a considerably long time until the actual engine speed reaches the determined desired engine speed, which means a relatively low response of the engine to a change in the throttle position $\theta$. A solution to obviate this drawback is proposed in Japanese Patent Application No. 58-17550 filed in 1983 in the name of the assignee of the present application, wherein the speed Ne of the engine or the speed ratio e of the CVT is regulated so that the actual engine speed coincides with the desired engine speed No. More specifically, when the throttle position $\theta$ is changed at a comparatively high rate, the desired engine speed No is changed in steps after a predetermined time delay Ta', by a varying step amount which is equal to a difference (Ns - Ns') multiplied by a predetermined stepping change rate B which is less than 1, where Ns represents a desired steady-state engine speed corresponding to the newly established throttle position $\theta$, while Ns' represents a desired steady-state engine speed corresponding to the previous throttle position $\theta$. Thereafter, the desired engine speed No is gradually changed so that it finally coincides with the desired steady-state engine speed corresponding to the newly established steady-state engine speed Ns. According to this proposed arrangement, the desired engine speed No in a transient vehicle condition is smoothly increased, whereby the actual engine speed is relatively quickly and smoothly accelerated. The delay time Ta' indicated above is provided to detect the final throttle position $\theta$ determined by the amount of depression of the accelerator pedal by the vehicle driver. However, in the event that the driver depresses the accelerator pedal by a comparatively large amount requiring a high rate of acceleration of the vehicle, which requires a kick-down of the transmission system, for example, the provided delay time Ta' will give the driver an impression or feeling that the vehicle is not highly responsive to the operation of the accelerator pedal. Thus, the delay time Ta' will deteriorate the drivability of the vehicle as felt by the driver. On the other hand, if the depression of the accelerator pedal by the driver is not completed within the determined delay time Ta', the stepping rate of increase of the engine speed is less than the finally desired rate, whereby the vehicle suffers from insufficient acceleration in the initial stage of depression of the acceleration pedal. It is further noted that the manner of controlling the CVT for adequate acceleration of the vehicle varies depending upon the specific running condition of the vehicle at which the accelerator pedal is operated.

SUMMARY OF THE INVENTION

It is accordingly an object of the present invention to provide an apparatus for controlling a CVT for an automotive vehicle, which permits adequate driving performance and feel of the vehicle, depending upon the output currently required by the vehicle driver, and the current speed of the vehicle.

The above object of the invention is achieved by the present invention which provides an apparatus for controlling a CVT connected to an engine of an automotive vehicle, wherein the transmission is controlled so that an actual speed of the engine coincides with a desired engine speed, the apparatus comprising: detecting means for detecting a rate of change in a position of an accelerator pedal of the vehicle; checking means for checking if the vehicle is in a transient state in which the rate of change in the accelerator pedal position exceeds a predetermined limit; first calculating means for calculating a value corresponding to a rate of change in the desired engine speed in the transient state of the vehicle, based on the detected rate of change in the accelerator pedal position; second calculating means for calculating the desired engine speed based on the value calculated by the first calculating means; and control means for controlling the continuously variable transmission so that the actual speed of the engine is equal to the desired engine speed calculated by the second calculating means.

In the apparatus of the present invention constructed as described above, a value which corresponds to a rate of change in the desired engine speed is determined based on a rate of change in the detected accelerator pedal position. The desired engine speed used in a transient state of the vehicle is calculated based on the thus determined value which reflects the rate of change in the accelerator pedal position. Since the desire of the vehicle driver to accelerate the vehicle is commensurate with a speed at which the accelerator pedal is operated, the instant arrangement is effective to give the driver a feeling that the vehicle is accelerated as expected by the driver who operated the accelerator pedal.

According to one advantageous feature of the invention, the detecting means comprises a sensor for detecting a throttle position of a throttle valve linked with the accelerator pedal.

In one advantageous form of the above feature of the invention, the apparatus further comprises timer means for measuring a lapse of time after the throttle position is changed from one position $\theta 1$ to another $\theta 2$. The second calculating means changes the desired engine speed from a first desired steady-state engine speed Ns1 corresponding to the throttle position $\theta 1$, to a second desired steady-state engine speed Ns2 corresponding to the throttle position $\theta 2$, in a predetermined time duration consisting of a first and a second time span detected by the timer means. The second calculating means determines the desired engine speed No based on the value calculated by the first calculating means in the first time span, such that a rate of change in the desired engine speed in the first time span is higher than that in the second time span. The relatively high rate of change in the desired engine speed in the first time span may make it possible to reduce or even eliminate the conventionally provided delay time Ta, thereby improving a response of the engine to the operation of the accelerator pedal.

Preferably, the second calculating means changes the desired engine speed in a stepping fashion in the first time span at a predetermined time interval $\Delta t$. In this case, the first calculating means may comprise means for calculating a rate B of stepping change in the desired engine speed No at the predetermined time interval $\Delta t$ in the first time span, as a function of the rate $\dot{\theta}$ of change in the throttle position $\theta$, and further comprises means for calculating a reference value $\Delta Nr$ at the predetermined time interval $\Delta t$. The second calculating means determines the desired engine speed No at the above time interval, based on the calculated reference value $\Delta Nr$ and the calculated rate B of stepping change.

In one form of the above arrangement, the reference value $\Delta Nr$ is a difference $\Delta Ns$ between two steady-state desired engine speeds Ns, Ns' corresponding to the throttle positions $\theta$, $\theta'$ detected at two successive times tx, tx' defined by the predetermined time interval $\Delta t$ (in the present and last control cycles).

In an alternative form of the above arrangement, the reference value $\Delta Nr$ is a difference (Ns - No') between a desired steady-state engine speed Ns corresponding to the throttle position $\theta$ detected in a present control cycle (tx), and the desired engine speed No' calculated by the second calculating means in the last control cycle (tx').

In another alternative form of the same arrangement, the reference value $\Delta Nr$ is a difference (Ns -Ne) between a desired steady-state engine speed Ns corresponding to the throttle position $\theta$ detected in a present control cycle (tx), and the actual engine speed Ne detected in the last control cycle (tx').

Thus, the throttle position $\theta$ at each time of calculation of the desired engine speed is reflected on the calculated desired engine speed.

It is possible that the rate B of stepping change of the desired engine speed min the first time span may be set differently depending upon the direction in which the throttle position is changed, i.e., depending upon whether the vehicle is accelerated or decelerated.

According to another feature of the invention, the apparatus further comprises means for detecting a running speed V of the vehicle, and the first calculating means calculates the value corresponding to a rate of change in the desired engine speed, based on the detected running speed of the vehicle, as well as on the detected rate of change in the accelerator pedal position.

BRIEF DESCRIPTION OF THE DRAWINGS

The above and other objects, features and advantages of the present invention will be better understood by reading the following description of a preferred embodiment of the invention, when considered in connection with the accompanying drawings, in which.

DESCRIPTION OF A PREFERRED EMBODIMENT

Figure 1:
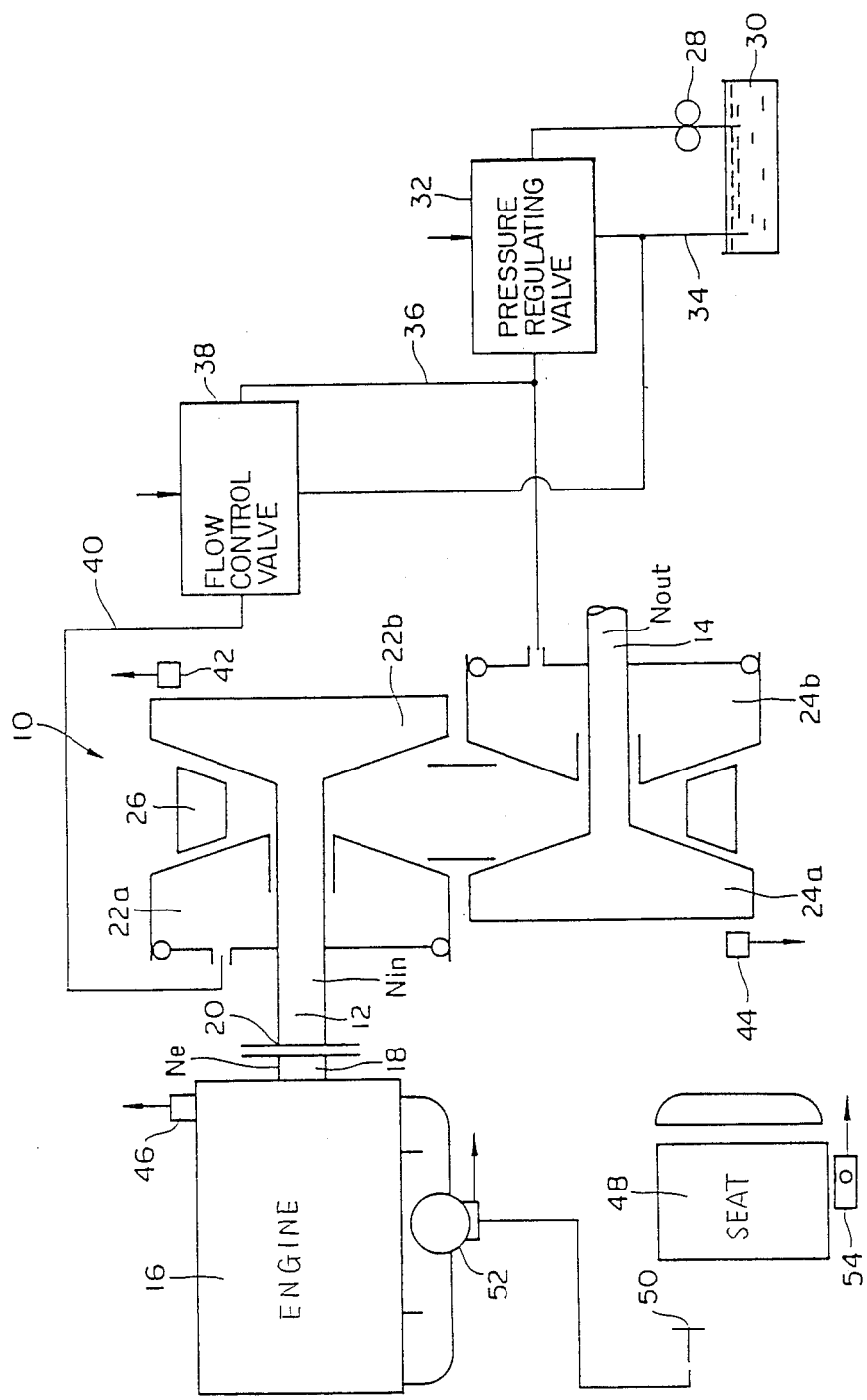
FIG. 1 is a schematic representation of an automotive vehicle having a CVT which is controlled by a control apparatus according to one embodiment of the invention.

Referring first to FIG. 1, there is shown a control apparatus in which a CVT 10 is provided with an input shaft 12 and an output shaft 14 which are parallel to each other. The input shaft 12 is disposed coaxially with a crankshaft 18 of an engine 16 of a vehicle, and connected thereto via a clutch 20. A pair of input pulleys 22a, 22b are disposed in spaced-apart relation with each other in the axial direction of the input shaft 12. The input pulley 22a is movable on the input shaft 12 in the axial direction, but not rotatable relative to the input shaft 12, while the input pulley 22b is fixed to the input shaft 12 and stationary relative to the movable pulley 22a. Similarly, a pair of output pulleys 24a, 24b are disposed on the output shaft 14, as a stationary and a movable pulley. The stationary output pulley 24a is fixed relative to the movable output pulley 24b which is movable on the output shaft 14 in the axial direction but not rotatable relative to the output shaft 14. Each pair of the input and output pulleys 22a, 22b and 24a, 24b have tapered inner surfaces facing each other. A belt 26 having an equilateral trapezoidal cross sectional shape engages the tapered inner surfaces of the input and output pulleys 22a, 22b, 24a, 24b, so as to transmit rotating movement of the input pulleys 22a, 22b to the output pulleys 24a, 24b. An oil pump 28 is provided to deliver a pressurized fluid from an oil reservoir 30 to a pressure regulating valve 32, which controls the line pressure in an oil path 36, by adjusting the amount of flow of the fluid back into the reservoir 30 through a drain line 34. The line pressure in the oil path 36 is applied to an output-side hydraulic cylinder for operating the movable output pulley 24b, and to a flow control valve 38 which is connected by an oil path 40 to an input-side hydraulic cylinder for operating the movable input pulley 22a. The flow control valve 38 is provided to adjust the rate of flow of the fluid supplied to the input-side hydraulic cylinder, and the rate of flow of the fluid from the path 40 into the drain line 34. The forces of the pulleys 22a, 22b, 24a, 24b exerted on the belt 26 are changed by the pressures in the input-side and output-side hydraulic cylinders. The effective radii of the input and putout pulleys 22, 24 engaging the belt 26 are varied in relation to the forces of the pulleys 22, 24, thereby changing the speed ratio e (Nout/Nin) of the CVT 10, where Nout is the rotating speed of the output shaft 14, while Nin is the rotating speed of the input shaft 12. The tension of the belt 26 is adjusted primarily by the pressure in the output-side hydraulic cylinder. To minimize the power loss of the oil pump 28, the pressure in the output-side hydraulic cylinder is held at a minimum level necessary to ensure power transmission from the input 25 pulley 22 to the output pulley 24, without a slip of the belt 26 on the pulleys. The speed ratio e of the CVT 10 is controlled primarily by changing the pressure in the input-side hydraulic cylinder. The pressure in the input-side hydraulic cylinder is controlled so as not to exceed the pressure in the output-side hydraulic cylinder. However, since the pressure receiving area of the input-side hydraulic cylinder is greater than that of the output-side hydraulic cylinder, the force of the input pulleys 22a, 22b against the belt 26 may be made greater than that of the output pulleys 24a, 24b.

A first speed sensor 42 and a second speed sensor 44 are provided to detect the rotating speeds Nin and Nout of the input and output shafts 12, 14, respectively. A temperature sensor 46 is provided to detect the temperature of the cooling water of the engine 16. In front of a driver's seat of the vehicle is disposed an accelerator pedal 50 which is linked with a throttle valve provided in the intake manifold of the engine. The throttle position $\theta$ of the throttle valve is sensed by a throttle-position sensor 52. A shift-position sensor 54 is provided to detect the currently selected position of a shift lever disposed adjacent to the driver's seat 48.

Figure 2:
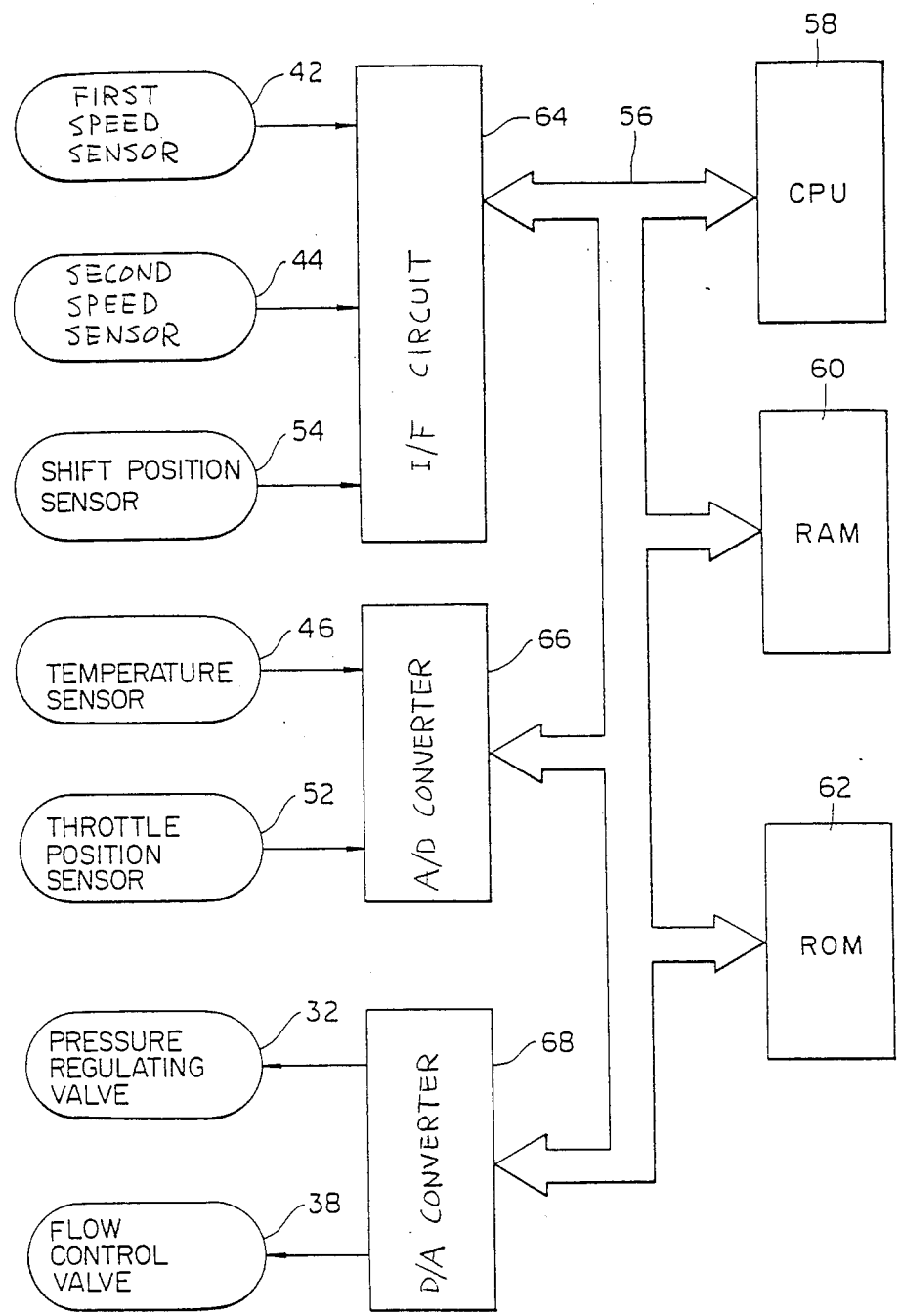
FIG. 2 is a block diagram showing an electronic control unit of the control apparatus.

Referring next to the block diagram of FIG. 2 showing an electronic control unit of the control apparatus which has an address data bus 56 for interconnection of a central processing unit (CPU) 58, a random-access memory (RAM) 60, a read-only memory (ROM) 62, an interface (I/F) circuit 64, an analog-to-digital (A/D) converter 66 and a digital-to-analog (D/A) converter 68. The I/F circuit 64 receives pulse signals from the first and second speed sensors 42, 44, and from the shift-position sensor 54. The A/D converter 66 receives analog signals from the temperature and throttle-position sensors 46, 52 The D/A converter 68 applies pulse outputs to the pressure regulating valve 32 and flow control valve 38.

Figure 3:
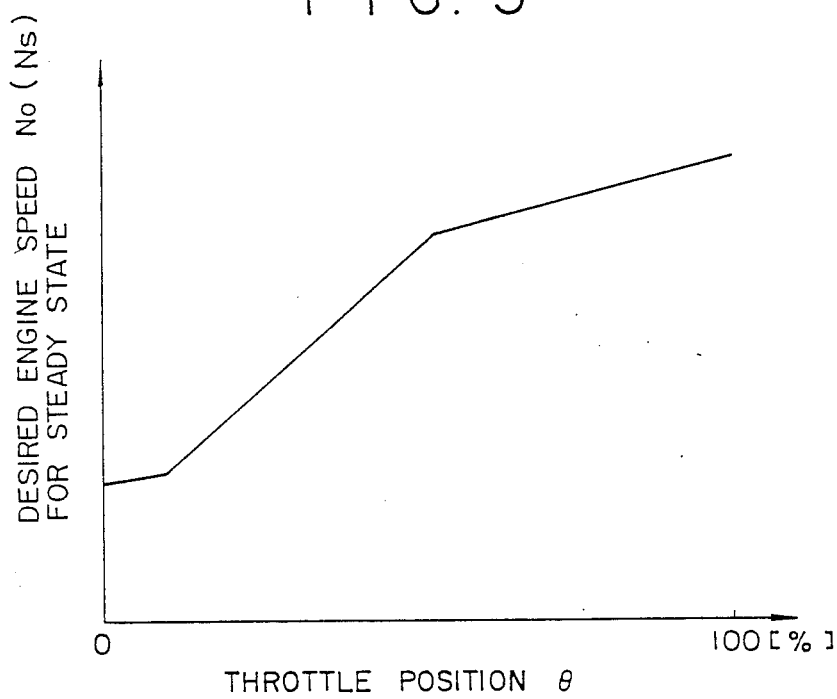
FIG. 3 is a graph showing the desired steady-state engine speed varying as a function of the throttle position.
Figure 4:
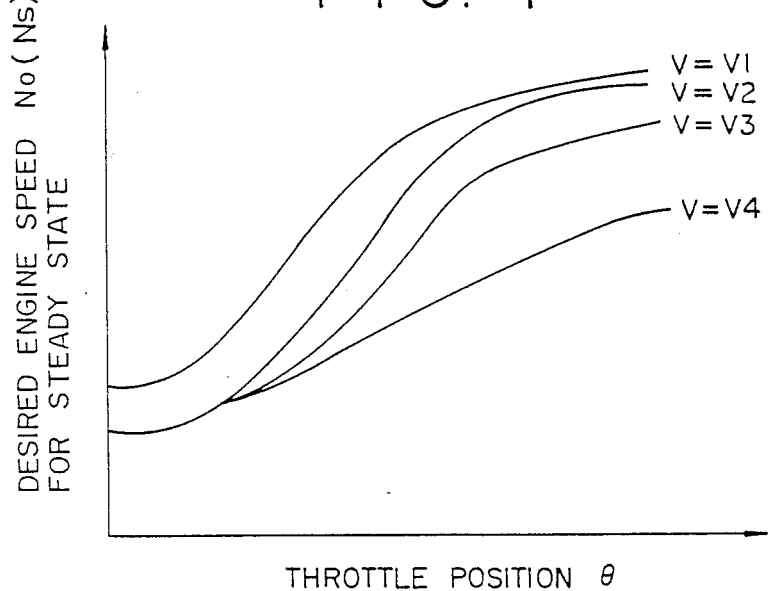
FIG. 4 is a graph showing the desired steady-state engine speed varying as a function of the throttle position and the vehicle speed.

The graphs in FIGS. 3 and 4 show a desired speed No of the engine 16 used while the vehicle is running in a steady state with substantially no change in the throttle position $\theta$, that is, desired steady-state engine speed Ns. According to the curve of FIG. 3, the desired steady-state engine speed Ns is varied as a function of the throttle position $\theta$ alone. FIG. 4 shows an alternative arrangement in which different Ns -$\theta$ curves are used for different vehicle speeds V1-V4, wherein V1>V2>V3>V4. With the desired steady-state engine speed Ns determined according to the relation of FIGS. 3 or 4, the speed ratio e of the CVT 10 is controlled according to a suitable CVT-control routine (not shown), so that the input speed Nin of the input shaft 12 or the actual speed of the engine 16 coincides with the determined desired engine speed Ns.

Figure 5:
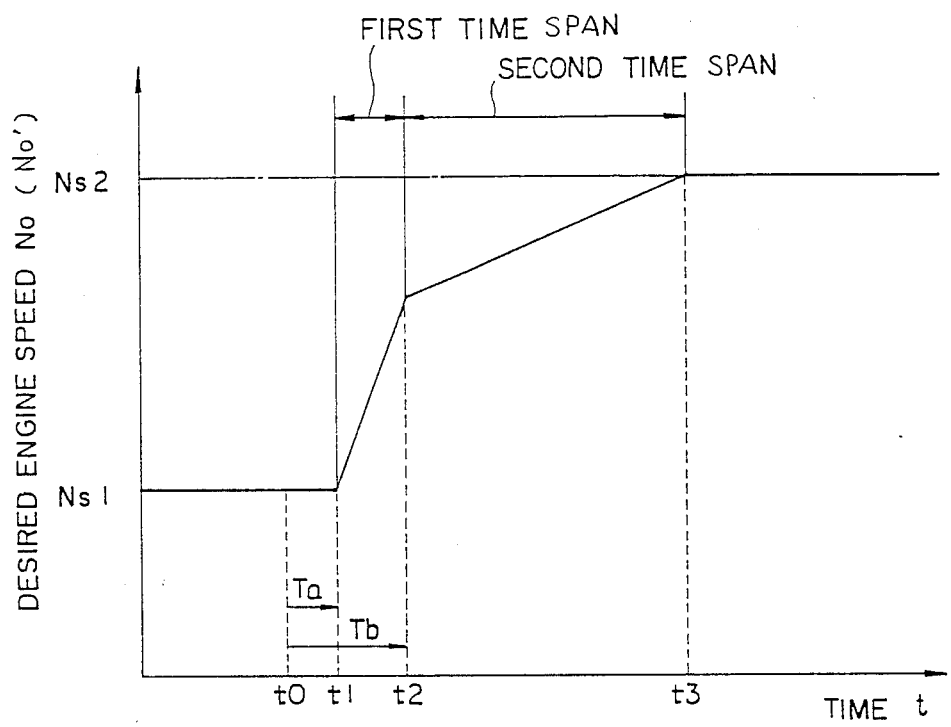
FIG. 5 is a graphical representation of a change of the desired engine speed in a transient state of the vehicle.

The graph in FIG. 5 shows a change in desired speed No of the engine 16 used while the vehicle is running in a transient state with the throttle position $\theta$ being changed, that is, desired transient-state engine speed No'. The desired steady-state engine speed Ns and the desired transient-state engine speed No' are referred to generally as desired engine speed No.

The operation of the instant control apparatus in a transient state of the vehicle will be described in detail, referring to FIGS. 5 and 6.

In the example of FIG. 5, it is assumed that the throttle position $\theta$ is changed from $\theta 1$ to $\theta 2$ at a time t0. The steady-state engine speeds Ns corresponding t1 the throttle positions $\theta 1$ and $\theta 2$ are Ns1 and Ns2, respectively. As indicated in the figure, the steady-state engine speed between t1 and t2. This period Ta is referred to as a delay time, and may be zero (Ta=0). In the following time period between t1 and t2 (end of a time lapse Tb from t1), i.e., in a first time span (Tb - Ta) following the delay time Ta, the desired engine speed No (desired transient-state engine speed No') is increased at a relatively high rate from the level of Ns1 to a suitable level below Ns2. In the period following the first time span, i.e., in a second time span between t2 and t3, the desired engine speed No (No') is increased to the level of Ns2, at a relatively low rate, as indicated in FIG. 5. Thus, the rate of increase in the desired engine speed No in the first time span t1-t2 is set higher than in the second time span t2-t3.

It is noted that the rate of change (rate of increase) in the desired transient-state engine speed No', namely, the slope of the No-t curve is determined as a function of a rate of change in the throttle position $\theta$, or as a function of both the rate of change in the throttle position $\theta$ and the vehicle speed V, at least for the first time span t1-t2.

Figure 6:
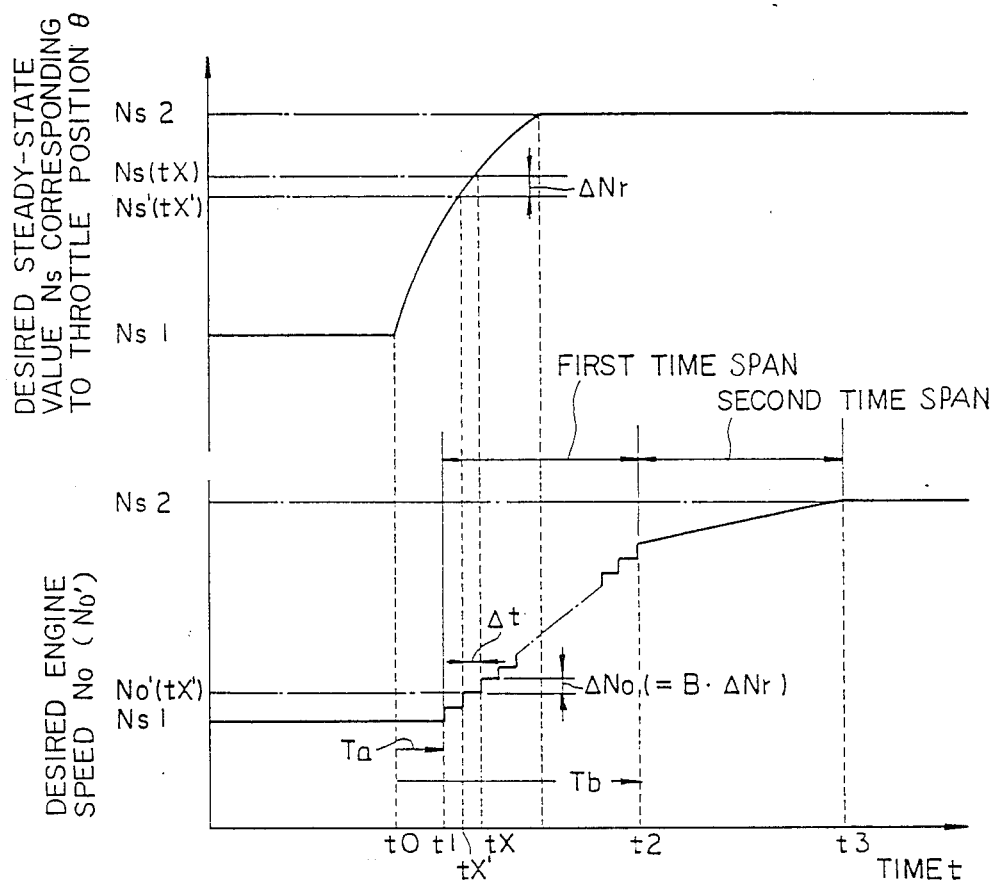
FIG. 6 is a graphical representation showing a specific manner of changing the desired transient-state engine speed.

FIG. 6 shows a specific manner of changing the desired engine speed No in a transient state of the vehicle (i.e., desired transient-state engine speed No'). In this example, the desired transient-state engine speed No' is increased in steps in the first time span t1-t2. An amount of increase or an increment $\Delta$No per unit time $\Delta$t of the desired engine speed No is varied as described below in detail. The unit time $\Delta$t may be a comparatively short length of time which is necessary for the CVT 58 to receive the output of the throttle sensor 52 via the A/D converter 66, or the unit time $\Delta$t may be a multiple of that length of time. In the present example, the unit time $\Delta$t is equal to the cycle time of a routine of FIG. 7 for calculating the desired engine speed No in a transient state of the vehicle. The desired transient-state engine speed No' is calculated for each unit time $\Delta$t. The increment $\Delta$No for each specific unit time is obtained from the following equation (1):

$$\Delta No = B \cdot \Delta Nr \qquad (1)$$

where, B: rate of stepping change $\Delta$Nr: reference value.

The stepping change rate B is determined as a function of the rate of change in the throttle position $\theta$, or as a function of the rate of change in the throttle position $\theta$ and the vehicle speed V. Different functions may be employed for the change rate B, depending upon the direction in which the throttle position $\theta$ is changed (i.e., whether the vehicle is being accelerated or decelerated).

The reference value $\Delta$Nr is determined by one of the following three equations (2), (3) and (4):

$$\Delta Nr = [Ns(tx) - No'(tx')] \qquad (2)$$

$$\Delta Nr = [Ns(tx) - Ns'(tx')] \quad (3)$$

$$\Delta Nr = [Ns(tx) - Ne(tx')] \quad (4)$$

where,

Ns(tx): desired steady-state engine speed Ns corresponding to throttle position $\theta$ at the present time tx (in the present control cycle), No'(tx'): desired transient-state engine speed No' at the preceding time tx' (in the last control cycle)

Ns'(tx'): desired steady-state engine speed Ns corresponding to throttle position $\theta'$ at the preceding time tx', Ne(tx): actual engine speed Ne at the present time tx.

Figure 7:
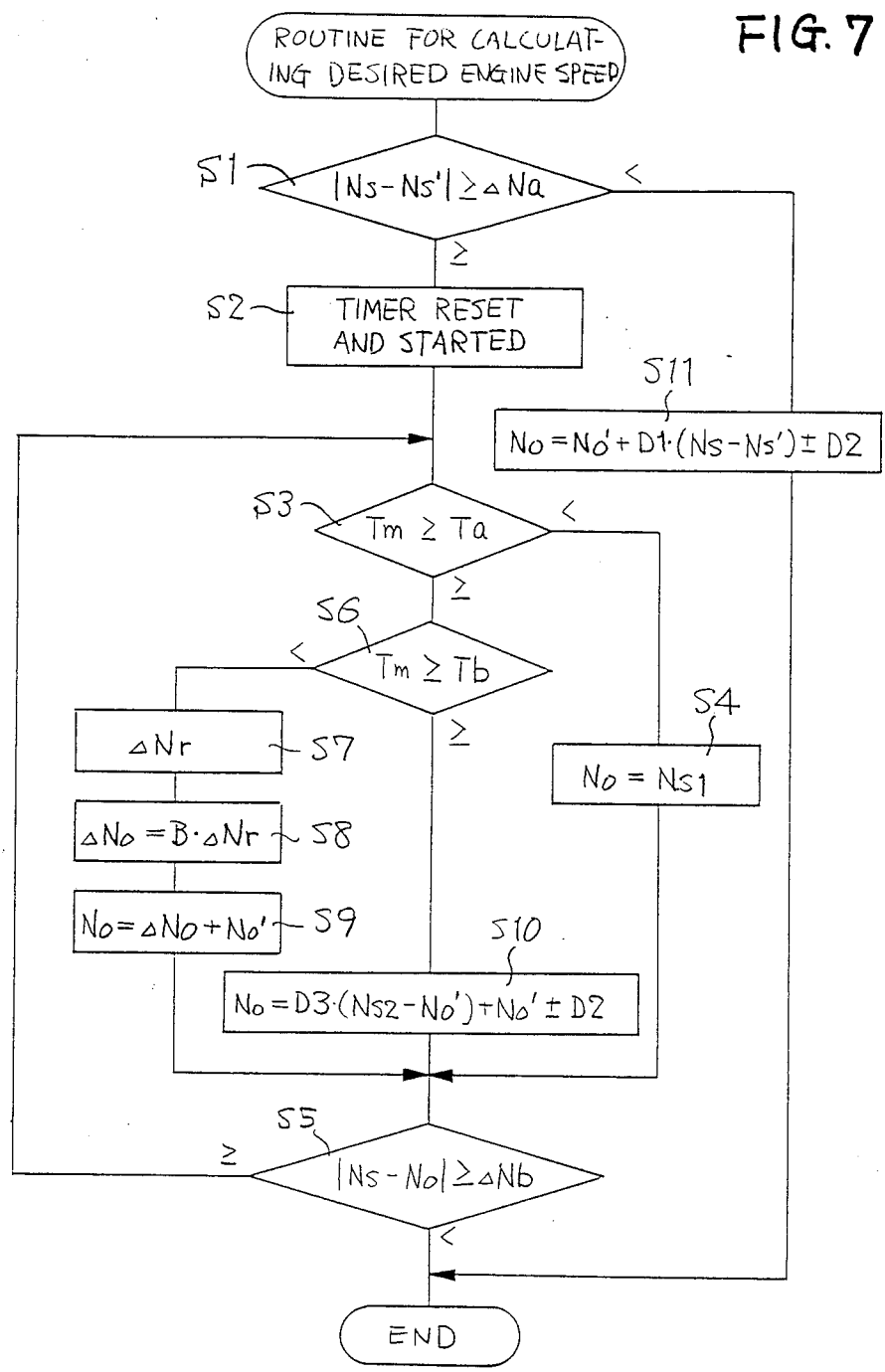
FIG. 7 is a flow chart showing a routine for obtaining the desired transient-state engine speed.

Referring next to a flow chart of FIG. 7, there will be described a routine for calculating a desired engine speed No of the engine 16 in a transient state of the vehicle.

Initially the CPU 58 executes step S1 to obtain an absolute value of (Ns - Ns') which is a difference between the desired steady-state engine speed Ns in the present control cycle, and the engine speed Ns' in the last control cycle, and to compare the obtained absolute value (Ns - Ns') with a predetermined value $\Delta$Na stored in the ROM 62. This comparison is made to check if the accelerator pedal 50 has been operated at a comparatively high rate, or if the rate of change of throttle position $\theta$ exceeds a preset limit. Namely, step S1 is executed to check if the vehicle is in a transient state. If the checking in step S1 reveals that the absolute value is equal to or greater than the predetermined value $\Delta$Na, step S2 and subsequent steps S3–S11 are executed However, if the absolute value is smaller than the predetermined value $\Delta$Na, namely, if there arises substantially no change in the throttle position $\theta$, step S1 is followed by step S11 which will be described.

In step S2, a timer 102 (FIG. 8) is reset and activated to start measurement of a time lapse. Then, the CPU 58 goes to step S3 to check if the current content Tm of the timer 102 is equal to or greater than the preset value Ta of the delay time previously indicated. If the content Tm of the timer 102 is smaller than the preset delay time Ta, step S3 is followed by step S4 in which the desired steady-state engine speed Ns1 is used as the desired engine speed No. The value Ns1 corresponds to the previous throttle position $\theta$1 from which the throttle position $\theta$ was increased at a relatively high rate to the throttle position $\theta$2 at the time t0, as previously indicated. This value Ns1 is continuously used as the desired engine speed No (desired transient-state engine speed No'), until the checking in step S3 reveals that the current content Tm of the time reaches the preset delay time Ta. Step S4 is followed by step S5 in which an absolute value (Ns - No) of a difference between the desired steady-state engine speed Ns corresponding to the current throttle position $\theta$ and the determined engine speed No is compared with a preset value $\Delta$Nb also stored in the ROM 62. If the difference (Ns - No) is equal to or greater than the preset value $\Delta$Nb, this means that the control for the previously indicated first time span t1–t2 is still necessary. In this case, therefore, step S5 is followed by step S3.

In the case where the checking in step S3 reveals that the current content Tm of the timer 102 is equal to or greater than the preset value Ta (if the delay time Ta has elapsed), step S3 is followed by step S6 to check if the content Tm of the timer 102 is equal to or greater than the value Tb (previously described) which is larger than the delay time Ta. If the content Tm of the timer 102 is smaller than the value Tb, the CPU 58 goes to step S7 to determine the reference value $\Delta$Nr according to one of the equations (2), (3) and (4) previously indicated. Then, the CPU 58 goes to step S8 to calculate the increment $\Delta$No (an amount of change of No/$\Delta$t) according to the equation (1) previously indicated.

$$\Delta No = B \cdot \Delta Nr \quad (1)$$

where, B: rate of stepping change, which is varied as a function of a changing rate $\dot{\theta}$ of the throttle position, or as a function of the changing rate $\dot{\theta}$ and the vehicle speed V Then, the CPU 58 goes to step S9 to calculate the desired engine speed No (transient-state engine speed No') according to the following equation (5):

$$No = \Delta No + No' \quad (5)$$

where, No': desired engine speed in the last control cycle

Steps S7 through S9 are repeated until the content the timer 102 reaches the preset value Tb, that is, until the first time span t1–t2 of FIG. 6 has elapsed. During the repeated execution of steps S7–S9, the desired engine speed No (No') is repeatedly updated. As indicated above, the stepping change rate B is varied as a function of the changing rate $\dot{\theta}$ of the throttle position $\theta$ (or as a function of this rate $\dot{\theta}$ and the vehicle speed V). Therefore, the desired transient-state engine speed No' obtained is changed as a function of the rate $\dot{\theta}$ at which the throttle position 8 is changed.

When the checking in step S6 indicates that the timer content Tm reaches the preset value Tb after the repeated execution of step S7–S9, step S6 is then followed by step S10 in which the desired engine speed No (transient-state engine speed No') is calculated according to the following equation (6):

$$No = D3(Ns2 - Ns') + No' \pm D2 \quad (6)$$

where,

D2: constant

D3: constant (less than 1)

Ns2: desired steady-state engine speed corresponding to the throttle position $\theta$2

The desired engine speed No (No') used in the second time span t2–t3 is increased at a rate lower than the average rate of increase of the desired engine speed No in the first time span t1–t2. Thus, the desired engine speed No is increased to the value Ns2 which corresponds to the throttle position $\theta$2, namely, the desired engine speed No reaches the value Ns corresponding to the currently established throttle position $\theta$. Consequently, the checking in step S5 reveals that the difference between Ns and No is smaller than the preset value $\Delta$Nb, whereby the CPU 58 goes back to step S1. In this condition, the checking in step S1 reveals that the absolute value (Ns - Ns') is smaller than the preset value $\Delta$Na, and step S1 is followed by step S11 to calculate the desired engine speed No according to the following equation (7):

$$No = D1(Ns - Ns') + No' \pm D2 \quad (7),$$

where,

D1: constant (less than 1)

Ns: desired steady-state engine speed Ns corresponding to the throttle position $\theta$2

Ns′: desired steady-state engine speed Ns in the preceding control cycle

Figure 8:
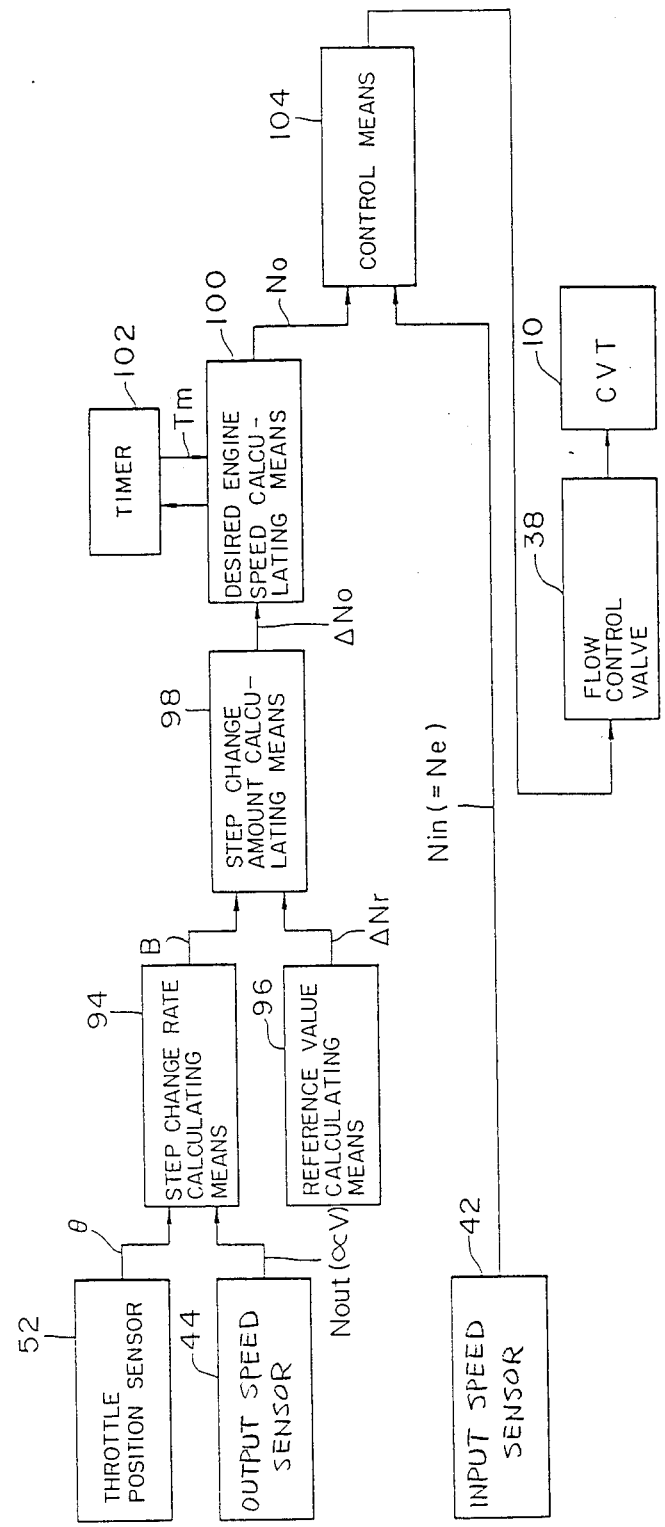
FIG. 8 is a block diagram showing various functional elements of the control apparatus.

FIG. 8 shows an arrangement of the various functional elements of the illustrated embodiment. The output speed Nout of the output shaft 14 (see FIG. 1) detected by the output speed sensor 44 is proportional to the vehicle speed V. This output speed Nout and the throttle position $\theta$ are applied to means 94 for calculating the stepping change rate B. The calculating means calculates the change rate B based on the rate of change in the throttle position $\theta$ alone, or on the rate of change in the throttle position $\theta$ and the output speed Nout (vehicle speed V). Means 96 is provided to calculate the reference value $\Delta$Nr previously defined. The calculated reference value $\Delta$Nr and the stepping change rate B are applied to means 98 for calculating the increment or decrement amount $\Delta$No (amount of change in the desired engine speed No per unit time $\Delta$t) according to the equation (1) previously given. Means 100 receives the calculated value $\Delta$No from the calculating means 98, and detects the first time span t1–t2 based on the content Tm of the timer 102. In the detected first time span, the desired engine speed No is changed by the calculated value $\Delta$No for each time interval $\Delta$t. Control means 104 are adapted to receive the thus updated desired engine speed No, and the input speed Nin of the input shaft 12 of the CVT 10, which input speed Nin is equal to the actual speed Ne of the engine 16. The control means 104 is operated to control the flow control valve 38 and consequently the CVT 10, based on the desired engine speed No, so that the actual engine speed Ne coincides with the desired engine speed No.

While the present invention has been described in its preferred embodiment with a certain degree of particularity, it is to be understood that the invention is not limited the illustrated embodiment, but various changes, modifications and improvements may be made in the invention without departing from the spirit and scope of the invention defined in the appended claims.

What is claimed as new and desired to be secured by Letters Patent of the United States is:

1. An apparatus for controlling a continuously variable transmission connected to an engine of an automotive vehicle, wherein the transmission is controlled so that an actual speed of the engine coincides with a desired engine speed, said apparatus comprising:
   detecting means for detecting a rate of change in a position of an accelerator pedal of the vehicle;
   checking means for checking if the vehicle is in a transient state in which the rate of change in the accelerator pedal position exceeds a predetermined limit;
   first calculating means for calculating a value corresponding to a rate of change in the desired engine speed in said transient state of the vehicle, based on the detected rate of change in the accelerator pedal position;
   second calculating means for calculating said desired engine speed based on said value calculated by said first calculating means; and
   control means for controlling a speed ratio of the continuously variable transmission so that said actual speed of the engine is equal to the desired engine speed calculated by said second calculating means.

2. An apparatus for controlling a continuously variable transmission according to claim 1, further comprising means for detecting a running speed of the vehicle, and wherein said first calculating means calculates said value corresponding to a rate of change in the desired engine speed, based on the detected running speed of the vehicle, as well as on said detected rate of change in the accelerator pedal position.

3. An apparatus for controlling a continuously variable transmission according to claim 1, wherein said detecting means comprises a sensor for detecting a throttle position of a throttle valve linked with said accelerator pedal.

4. An apparatus for controlling a continuously variable transmission according to claim 3, further comprising timer means for measuring a lapse of time after said throttle position is changed from one position to another, and wherein said second calculating means changes said desired engine speed from a first desired steady-state engine speed corresponding to said one throttle position, to a second desired steady-state engine speed corresponding to said another throttle position, in a predetermined time duration consisting of a first and a second time span detected by said timer means, said second calculating means determining said desired engine speed based on said value calculated by said first calculating means in said first time span, such that a rate of change in said desired engine speed in said first time span is higher than that in said second time span.

5. An apparatus for controlling a continuously variable transmission connected to an engine of an automotive vehicle, wherein the transmission is controlled so that an actual speed of the engine coincides with a desired engine speed, said apparatus comprising:
   detecting means for detecting a rate of change in a position of an accelerator pedal of the vehicle;
   timer means for measuring a lapse of time after the position of said accelerator pedal is changed from one position to another;
   checking means for checking if the vehicle is in a transient state in which the rate of change in the accelerator pedal position exceeds a predetermined limit;
   first calculating means for calculating a value corresponding to a rate of change in the desired engine speed in said transient state of the vehicle, based on the detected rate of change in the accelerator pedal position;
   second calculating means for calculating said desired engine speed based on said value calculated by said first calculating means, to change said desired engine speed from a first desired steady-state engine speed corresponding to said one accelerator pedal position, to a second desired steady-state engine speed corresponding to said another accelerator pedal position, in a predetermined time duration after the position of said accelerator pedal is changed, said second calculating means determining said desired engine speed based on said value calculated by said first calculating means in a first time span of said time duration detected by said timer means, such that a rate of change in said desired engine speed in said first time span is higher than in a second time span of said time duration which follows said first time span; and
   control means for controlling a speed ratio of the continuously variable transmission so that said actual speed of the engine is equal to the desired engine speed calculated by said second calculating means.

6. An apparatus for controlling a continuously variable transmission according to claim 5, wherein said second calculating means changes said desired engine speed in a stepping fashion in said first time span at a predetermined time interval.

7. An apparatus for controlling continuously variable transmission according to claim 6, wherein said first calculating means comprises means for calculating a rate of stepping change in said desired engine speed at said predetermined time interval in said first time span, as a function of said rate of change in said throttle position, and further comprises means for calculating a reference value at said predetermined time interval, said second calculating means determining said desired engine speed at said time interval, based on the calculated reference value and the calculated rate of stepping change.

8. An apparatus for controlling a continuously variable transmission according to claim 7, wherein said reference value is a difference between two steady-state desired engine speeds corresponding to the throttle positions detected at two successive times defined by said predetermined time interval.

9. An apparatus for controlling a continuously variable transmission according to claim 7, wherein said reference value is a difference between a desired steady-state engine speed corresponding to the throttle position detected in a present control cycle, and the desired engine speed calculated by said second calculating means in the last control cycle.

10. An apparatus for controlling a continuously variable transmission according to claim 7, wherein said reference value is a difference between a desired steady-state engine speed corresponding to the throttle position detected in a present control cycle, and the actual engine speed detected in the last control cycle.

11. An apparatus for controlling a continuously variable transmission according to claim 7, wherein the rate of stepping change of said desired engine speed in said first time span for an increase in said throttle position is different from that for a decrease in said throttle position.

* * * * *

UNITED STATES PATENT AND TRADEMARK OFFICE
CERTIFICATE OF CORRECTION

PATENT NO. : 4,872,115
DATED : Oct. 3, 1989
INVENTOR(S) : Hiroshi Itoh, et al

It is certified that error appears in the above-identified patent and that said Letters Patent is hereby corrected as shown below:

Title page:

The total number of drawing sheets is incorrectly recorded, "8", should be:

--7--

Signed and Sealed this

Thirtieth Day of October, 1990

Attest:

HARRY F. MANBECK, JR.

*Attesting Officer*    *Commissioner of Patents and Trademarks*